United States Patent
Katayama

(10) Patent No.: US 8,742,301 B2
(45) Date of Patent: Jun. 3, 2014

(54) HEATER APPARATUS FOR A DISPLAY PANEL

(75) Inventor: Yasushi Katayama, Shimada (JP)

(73) Assignee: Yazaki Corporation, Tokyo (JP)

( * ) Notice: Subject to any disclaimer, the term of this patent is extended or adjusted under 35 U.S.C. 154(b) by 253 days.

(21) Appl. No.: 13/057,407

(22) PCT Filed: Aug. 5, 2009

(86) PCT No.: PCT/JP2009/064215
§ 371 (c)(1),
(2), (4) Date: Feb. 3, 2011

(87) PCT Pub. No.: WO2010/016614
PCT Pub. Date: Feb. 11, 2010

(65) Prior Publication Data
US 2011/0139766 A1    Jun. 16, 2011

(30) Foreign Application Priority Data
Aug. 5, 2008    (JP) .................................. 2008-201770

(51) Int. Cl.
*H05B 1/02*    (2006.01)

(52) U.S. Cl.
USPC ........................................................ 219/494

(58) Field of Classification Search
USPC ......... 219/494, 497, 209, 543, 544, 510, 517; 345/208
See application file for complete search history.

(56) References Cited

U.S. PATENT DOCUMENTS

| 4,623,222 A | 11/1986 | Itoh et al. |
| 5,563,624 A | 10/1996 | Imamura |
| 5,903,260 A | 5/1999 | Imamura |
| 6,891,129 B2 * | 5/2005 | Pala et al. ..................... 219/209 |
| 6,891,135 B2 | 5/2005 | Pala et al. |

FOREIGN PATENT DOCUMENTS

| EP | 1429174 A2 | 6/2004 |
| JP | 60-107432 A | 6/1985 |
| JP | 7-043680 A | 2/1995 |
| JP | 2000-164376 A | 6/2000 |
| JP | 2001-272961 A | 10/2001 |
| JP | 2000-072082 A | 3/2007 |

OTHER PUBLICATIONS

International Search Report for for PCT/JP2009/064215 issued Oct. 30, 2009 [PCT/ISA/210].
Office Action, dated Nov. 5, 2013, issued by the Japanese Patent Office, in counterpart Application No. 2008-201770.

* cited by examiner

*Primary Examiner* — Dana Ross
*Assistant Examiner* — Renee L Miller
(74) *Attorney, Agent, or Firm* — Sughrue Mion, PLLC

(57) ABSTRACT

A heater apparatus includes: a heater unit including a heater resistor; a first switching unit disposed on a downstream side of the heater resistor for on/off controlling a power supply path from a supply voltage; a second switching unit disposed on an upstream side of the heater resistor for on/off controlling the power supply path from the supply voltage; and a controller outputting first and second control signals for on/off controlling the first and second switching units, respectively. The first switching unit is switched on when the first control signal is high, and the second switching unit is switched on when the second control signal is low. The heater unit is switched on when the sensor temperature is equal to or lower than a first threshold, and is switched off when the sensor temperature is equal to or higher than a second threshold.

2 Claims, 4 Drawing Sheets

HEATER APPARATUS FOR A DISPLAY PANEL

TECHNICAL FIELD

The present invention relates to a heater apparatus and more particularly to, for example, a heater apparatus for controlling a temperature of a display panel to stay within a desired temperature range.

BACKGROUND ART

In recent years, there has been an increasing tendency of adopting liquid crystal panels as display devices on vehicles. In these liquid crystal panels, there is a configuration in which a cold-cathode tube is used as a back light which works as a light source. In general, the cold-cathode tube has a predetermined working temperature range, which is set to obtain a desired luminance. In particular, the cold-cathode tube has characteristics that the desired luminance cannot be obtained immediately after it is switched on, because the temperature in the interior of the cold-cathode tube is lower than the working temperature range set. Then, there have been proposed techniques in which the liquid crystal panel is controlled to be heated to the desired temperature by the use of a heater or the like (for example, refer to Patent Document 1).

FIG. 1 is a functional block diagram showing a schematic configuration of an LCD heater apparatus 110 for controlling a liquid crystal panel to stay within a desired temperature range, and the block diagram summarizes briefly and illustrates the technique disclosed in Patent Document 1 above. The LCD heater apparatus 110 includes a CPU 20, a heater control unit 140 and an LCD heater unit 70.

The CPU 20 includes a first port P10 and a second port P20 which are digital output ports for outputting a high or low signal, and an analog input port AN. Here, the second port P20 is not used. A thermistor 74 is connected to the analog input port AN via a sensor part 45 of the heater control unit 140.

The LCD heater unit 70 includes a heater 72 which is made up of a resistor, and the thermistor 74 which functions as a temperature sensor and is disposed in the vicinity of an LCD panel 80.

The heater control unit 140 includes the sensor part 45, a downstream-side controller 50, and a diode 41 for supplying power from a constant voltage power supply Vcc2 towards the heater 72. Specifically, an anode of the diode 41 is connected to the constant voltage power supply Vcc2, and a cathode of the diode 41 is connected to the heater 72. In addition, in a configuration in which the LCD heater apparatus 110 is installed on a vehicle, the constant voltage power supply Vcc2 is made to be interlocked with the on and off states of, for example, an ignition switch to supply power to the heater 72.

In the sensor part 45, a sensor resistor 43 and a capacitor 42 are connected in series between a constant voltage power supply Vcc1 and a ground potential. In addition, the thermistor 74 of the LCD heater unit 70 is connected between a connecting point T1 between the sensor resistor 43 and the capacitor 42 and the ground potential. In addition, the connecting point T1 is connected to the analog input port AN of the CPU 20. By this configuration, a change in resistance value of the thermistor 74 due to a change in temperature is inputted into the analog input port AN as a voltage change (partial pressures of the sensor resistor 43 and the thermistor 74), and the CPU 20 calculates a temperature in the thermistor 74 based on the input so made.

The downstream-side controller 50 is disposed on a downstream side of the heater 72 and includes a first switching device (a first switching unit) Tr1, a first resistor 52, and a second resistor 53. Specifically, the first switching device Tr1 is an n-channel FET (Field Effect Transistor), and a drain terminal D is connected to the heater 72, while a source terminal is connected to the ground potential. In addition, a gate terminal G is connected to the first port P10 via the first resistor 52. Resistance values of the first resistor 52 and the second resistor 53 are set in accordance with a voltage (a high voltage) that is applied to the gate terminal G and the switching characteristics of the first switching device Tr1. Additionally, when the first port P10 becomes high, the gate terminal G of the first switching device Tr1 becomes high, and the first switching device Tr1 is switched on. As this occurs, power is supplied from the constant voltage power supply Vcc2 to the heater 72, whereby the heater 72 heats the LCD panel 80. By this configuration, the CPU 20 on/off controls the downstream-side controller 50 (the first switching device Tr1) so as to control the supply of power to the heater 72 based on the temperature in the thermistor 74 sensed, whereby the LCD panel 80 is made to stay within the desired temperature range.

In addition, with a view to enhancing the display characteristics and enhancing the life of the LCD panel, there have been proposed techniques in which the temperature control is implemented in detail so that a back light of an LCD panel is turned off when the temperature of the back panel is low (for example, refer to Patent Document 2).

CITATION LIST

Patent Literature

[Patent Document 1] JP-A-60-107432
[Patent Document 2] JP-A-7-43680

In the LCD heater apparatus 110 described above, the downstream-side controller 50 for on/off controlling the supply of power to the heater 72 is disposed on the downstream side of the heater 70. The heater 70 is fixed in the on state when the first switching device Tr1 of the downstream-side controller 50 fails due to short-circuit resulting from solder failure or mixing of foreign matters, surge failure by noise or excess current failure, that is, when the first switching device Tr1 is fixed in the on state. As a result of this, there has been caused a fear that the fixation of the heater 72 in the on state results in heating up the LCD panel 80 excessively, whereby the LCD panel 80 is broken down, which is a serious failure.

SUMMARY OF INVENTION

The invention has been made in view of these situations and an object thereof is to provide a technique for solving the problem.

According to an aspect of the invention, there is provided a heater apparatus including: a heater unit including a heater resistor; a temperature sensor which senses a sensor temperature around the heater unit; a first switching unit which is disposed on a downstream side of the heater resistor for on/off controlling a power supply path from a supply voltage; a second switching unit which is disposed on an upstream side of the heater resistor for on/off controlling the power supply path from the supply voltage; and a controller which outputs first and second control signals for on/off controlling the first switching unit and the second switching unit, respectively, wherein the first switching unit is switched on when the first control signal is high, and the second switching unit is switched on when the second control signal is low, and wherein the controller controls the first and second switching units, such that the first and second switching units are controlled so as to switch on the heater unit when the sensor temperature is equal to or lower than a first threshold and that the first and second switching units are controlled so as to switch off the heater unit when the sensor temperature is equal to or higher than a second threshold.

In addition, the heater apparatus may further include a third switching unit which reverses on and off of the second control signal to output the reversed second control signal to the second switching unit.

According to the aspect of the invention, in the heater apparatus, a high redundancy can be realized for a failure in which the heater is fixed in the on state.

DESCRIPTION OF EMBODIMENTS

Figure 1:
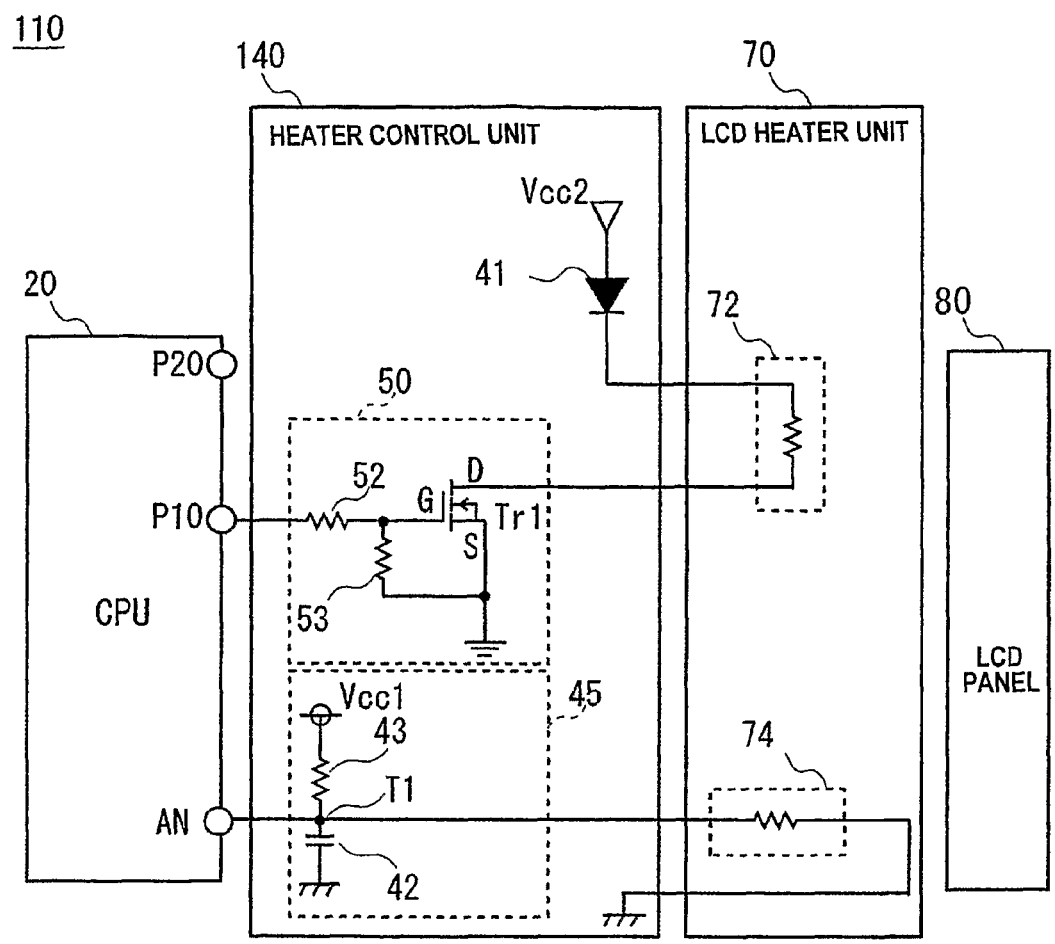
FIG. 1 is a functional block diagram showing the configuration of an LCD heater apparatus according to a related art.
Figure 2:
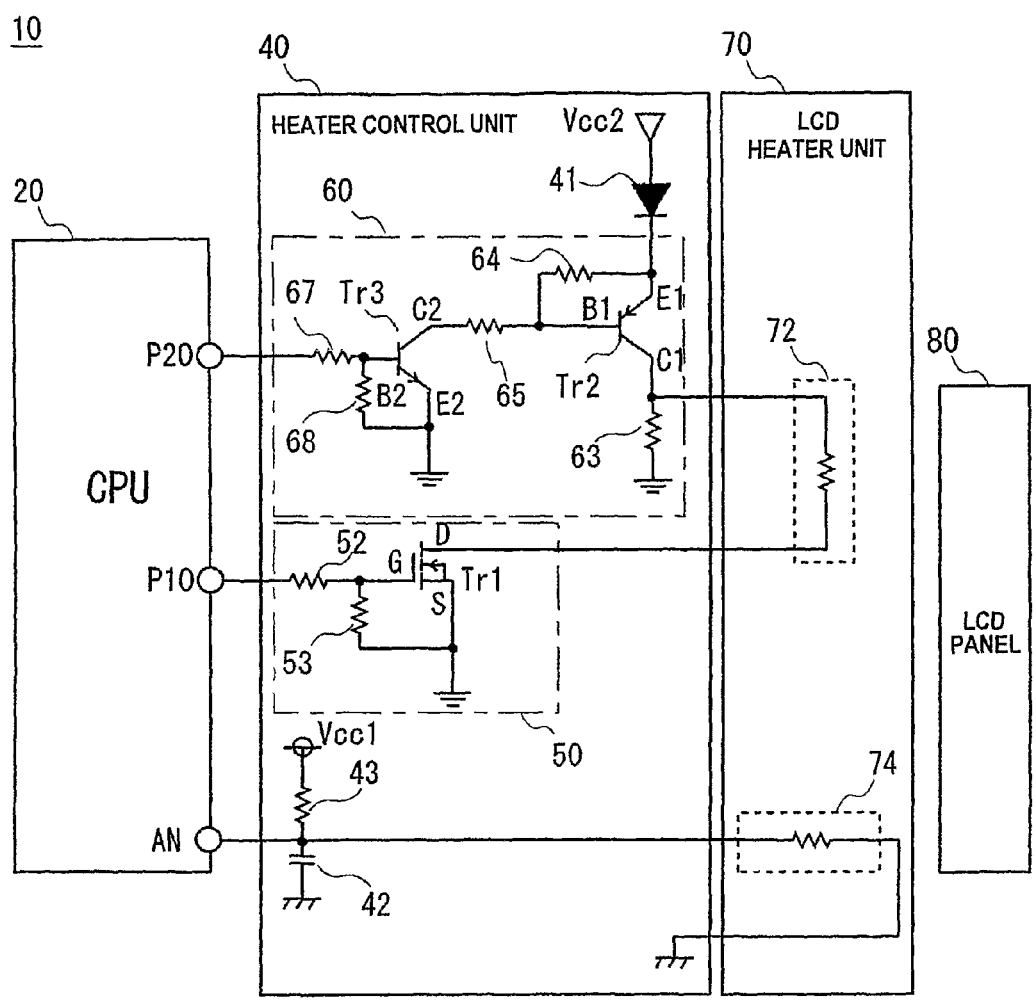
FIG. 2 is a functional block diagram showing the configuration of an LCD heater apparatus according to an embodiment of the invention.

Hereinafter, an embodiment of the invention will be described be reference to the drawings. FIG. 2 is a functional block diagram showing a schematic configuration of an LCD heater apparatus 10 according to this embodiment. In addition to the downstream-side controller 50 in the LCD heater apparatus 110 shown in FIG. 1, this LCD heater apparatus 10 also includes an upstream-side controller 60 having a similar on/off controlling function to that of the downstream-side controller 50, and this upstream-side controller 60 is disposed on an upstream side of a heater 72.

Since this LCD heater apparatus 10 differs from the LCD heater apparatus 110 shown in FIG. 1 in the provision of the upstream-side controller 60 in the way described above and control and operation of the upstream-side controller 60, like reference numerals will be given to configurations of the LCD heater apparatus 10 which are provided to realize similar functions to those of the LCD heater apparatus 110, and the description thereof will partially be omitted here.

The LCD heater apparatus 10 includes a CPU 20, a heater control unit 40, and an LCD heater control unit 70. The configurations of the CPU 20 and the LCD heater unit 70 are the same as those shown in FIG. 1.

The heater control unit 40 includes the upstream-side controller 60 which is connected to an upstream side of the heater 72 to function as a switch circuit and a downstream-side controller 50 which is connected to a downstream side of the heater 70 to function as a switch circuit. The downstream-side controller 50 has the same configuration and function as those shown in FIG. 1, and hence, the description thereof will be omitted.

The upstream-side controller 60 is a characteristic configuration of this embodiment and includes a second switching device (a second switching unit) Tr2 and a third switching device (a third switching unit) Tr3 which are used to on/off control a power supply path on the upstream side of the heater 72. The second switching device Tr2 is a pnp-type transistor, and the third switching device Tr3 is a npn-type transistor.

In addition, in the second switching device Tr2, an emitter terminal E1 is connected to a cathode of a diode 41, and a collector terminal C1 is connected to the heater 72. In addition, the collector terminal C1 is connected to a ground potential via a third resistor 63. Additionally, the emitter terminal E1 and a base terminal B1 are connected to each other via a fourth resistor 64. Further, the base terminal B1 of the second switching device Tr2 and a collector terminal C2 of the third switching device Tr3 are connected to each other via a fifth resistor 65. A base terminal B2 of the third switching device Tr3 is connected to a second port P20 via the CPU 20 and is connected further to an emitter terminal E2 via an eighth resistor 68.

According to this configuration, when the second port P20 becomes high, the third switching device Tr3 is switched on. In addition, by the third switching device Tr3 being switched on, the base terminal B1 of the second switching device Tr2 becomes low, and the second switching device Tr2 is switched on. As this occurs, in the event that a first switching device Tr1 is on, a current flows from a constant voltage power supply Vcc2 to the ground potential after it has flowed through the diode 41, the second switching device Tr2, the heater 72, and the first switching device Tr1, whereby power is supplied to the heater 72 so as to heat an LCD panel 80.

Figure 3:
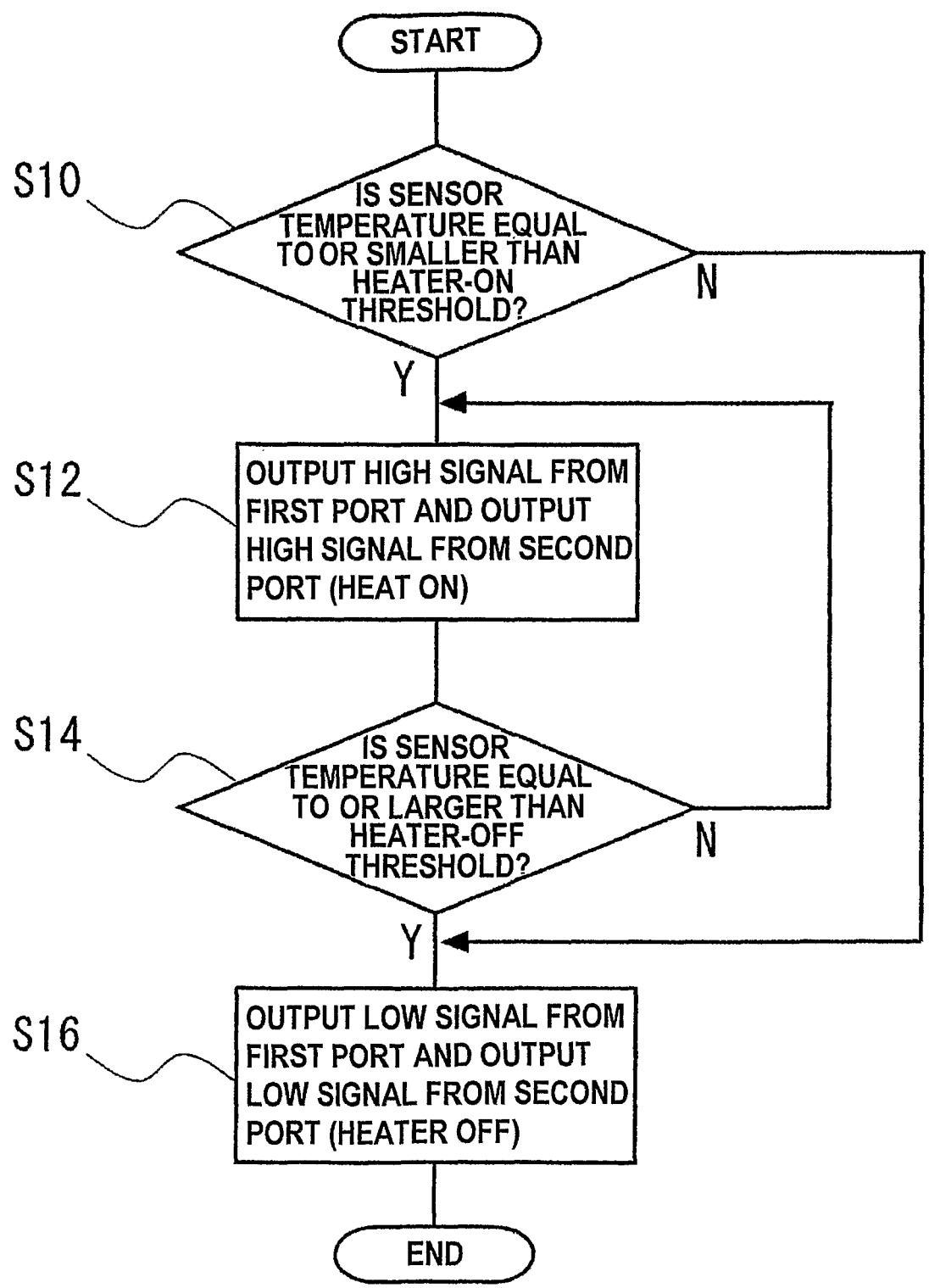
FIG. 3 is a flowchart showing an on/off control of a heater of the LCD heater apparatus according to the embodiment of the invention.

The heating operation of the LCD heater apparatus 10 based on the configuration that has been described above will be described below. FIG. 3 is a flowchart illustrating the heating operation of the LCD heater apparatus 10.

Firstly, the CPU 20 determines from a result of a measurement by a thermistor 74 which is inputted into an analog port AN whether or not the ambient temperature of the LCD panel 80, that is, the sensor temperature is equal to or smaller than a heat-on threshold which is a first threshold (S10). If the sensor temperature is equal to or smaller than the heater-on threshold (Y in S10), the CPU 20 outputs high signals from a first port P10 and the second port P20 (S12). Then, according to the circuit operation that has been described above, the first switching device Tr1 and the second switching device Tr2 are switched on, and power is supplied from the constant voltage power supply Vcc2 to the heater 72.

Following this, the CPU 20 determines based on the result of the measurement by the thermistor 74 whether or not the ambient temperature of the LCD panel 80 (the sensor temperature) is equal to or larger than a heater-off threshold which is a second threshold (S14). If the sensor temperature is smaller than the heater-off threshold (N in S14), the heating operation of the LCD heater apparatus 10 returns to the operation in step S12, where the CPU 20 continues to output high signals from the first port P10 and the second port P20 (S12).

On the contrary, if the sensor temperature is determined to be equal to or larger than the heater-off the threshold (Y in S14) and if the sensor temperature is determined to be larger than the heat-on temperature in the operation in step S10 (Y in S10), the CPU 20 outputs low signals from the first port P10 and the second port P20 (S16). By this, both the upstream side and downstream side of the heater 72, that is, both the second switching device Tr2 and the first switching device Tr1 are switched off, whereby the power supply to the heater 72 is stopped, and hence, the heating of the LCD panel 80 is stopped.

Figure 4A:
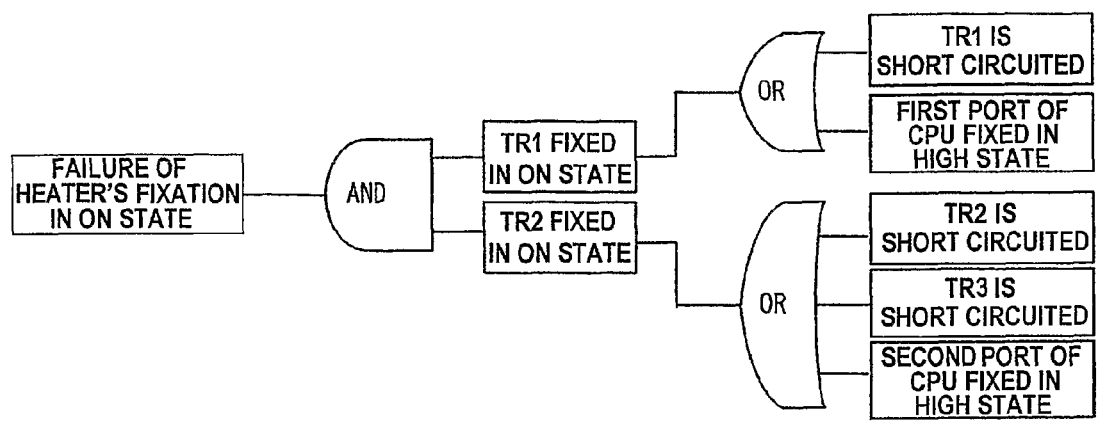
FIGS. 4A and 4B are diagrams illustrating redundancies of the LCD heater apparatus according to the embodiment of the invention and the LCD heater apparatus of the related art with respect to the fixation of a heater in an on state by comparing FTAs thereof.

Following this, a designed redundancy for the "heater fixation in the on state" which is a serious failure of the LCD heater apparatus 10 will be described by the use of diagrams of an FTA (Fault Tree Analysis) shown in FIG. 4. FIG. 4A shows an FTA regarding the LCD heater apparatus 10 according to this embodiment, and FIG. 4B shows an FTA regarding the LCD heater apparatus 110 according to the related art which has been described before.

Figure 4B:
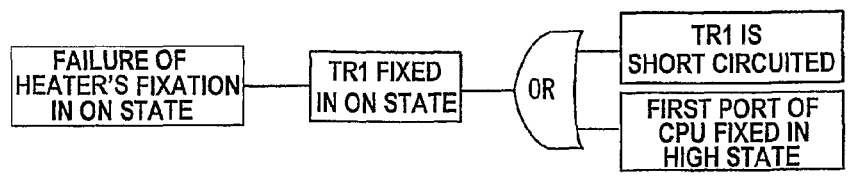

As is shown in FIG. 4B, in the LCD heater apparatus 110 according to the related art, when the first switching device Tr1 is short circuited or the output from the first port P10 is fixed in the high state, the first switching device Tr1 is fixed in the on state, whereby a "heater's on-state fixation failure" condition is produced in which power is supplied to the heater 72 at all times.

On the other hand, as is shown in FIG. 4A, in the LCD heater apparatus 10 according to this embodiment, the "heater's on-state fixation failure" is not produced unless both the first switching device Tr1 and the second switching device Tr2 are fixed in the on state. When the first switching device Tr1 is short circuited or the output from the first port P10 is fixed in the high state, the first switching device Tr1 is fixed in the on state as well as in FIG. 4B. The second switching device Tr2 is fixed in the on state when the second switching device Tr2 is short circuited, the third switching device Tr3 is short circuited, or the second port 20 is fixed in the high state.

Thus, as has been described heretofore, in the LCD heater apparatus 10 of this embodiment, the first switching device Tr1 is disposed on the downstream side of the heater 72 and the second switching device Tr2 is disposed on the upstream side of the heater 72. Because of this, even when the failure occurs in which the first switching device Tr1 is fixed in the on state, the heater 72 is not fixed in the on state unless the upstream-side second switching device Tr2 is fixed in the on state. Similarly, as to the second switching device Tr2, even when the failure occurs in which the second switching device Tr2 is fixed in the on state, the heater 72 is not fixed in the on state unless the first switching device Tr1 is fixed in the on state. Consequently, according to the embodiment, compared with the related art, the LCD heater apparatus 10 can be realized which has the high designed redundancy with respect to the fixation of the heater in the on state.

Thus, the embodiment of the invention has been described heretofore. This embodiment only illustrates an exemplary embodiment of the invention, and hence, it is obvious to those skilled in the art to which the invention pertains that various modifications will be made with respect to the respective constituent elements and combination thereof without departing from the spirit and scope of the invention and that those modifications also fall within those of the invention.

For example, while it is assumed that the general bi-polar transistors are used for the second switching device Tr2 and the third switching device Tr3, the second and third switching devices may be made up of FETs as with the first switching device Tr1. Namely, the second switching device Tr2 may be made up of a p-channel FET, and the third switching device Tr3 may be made up of an n-channel FET. In addition, while the upstream-side controller 60 of this embodiment is made up of the two transistors, that is, the second switching device Tr2 and the third switching device Tr3, the spirit of the invention is not limited thereto. In the event that the upstream-side controller 60 is made up of only the second switching device Tr2, the on and off of the second part P20 may be switched.

Namely, when the second switching device Tr2 is switched on, the second port P20 of the CPU 20 is made to output a low signal.

Industrial Applicability

According to the heater apparatus of the invention, a high redundancy can be realized for a failure in which the heater is fixed in the on state.

The invention claimed is:

1. A heater apparatus, comprising:
a heater unit including a heater resistor;
a temperature sensor which senses a sensor temperature around the heater unit;
a first switching unit which is disposed on a downstream side of the heater resistor for on/off controlling a power supply path from a supply voltage;
a second switching unit which is disposed on an upstream side of the heater resistor for on/off controlling the power supply path from the supply voltage;
a controller which outputs first and second control signals for on/off controlling the first and second switching units, respectively; and
a third switching unit which reverses the second control signal and outputs the reversed second control signal to the second switching unit,
wherein the first switching unit is switched on when the first control signal is high, and the second switching unit is switched on when the second control signal is low, and
wherein the controller controls the first and second switching units, such that the first and second switching units are controlled so as to switch on the heater unit when the sensor temperature is equal to or lower than a first threshold and so as to switch off the heater unit when the sensor temperature is equal to or higher than a second threshold.

2. A heater apparatus, comprising:
a heater unit;
a temperature sensor which senses a sensor temperature around the heater unit;
a first switching unit which is disposed on a downstream side of the heater unit for on/off controlling a power supply path from a supply voltage;
a second switching unit which is disposed on an upstream side of the heater unit for on/off controlling the power supply path from the supply voltage; and
a controller which outputs first and second control signals for on/off controlling the first and second switching units, respectively; and
a third switching unit which reverses the second control signal and outputs the reversed second control signal to the second switching unit,
wherein the controller controls the first and second switching units, such that the first and second switching units are controlled so as to switch on the heater unit when the sensor temperature is equal to or lower than a first threshold and so as to switch off the heater unit when the sensor temperature is equal to or higher than a second threshold.

* * * * *